R. R. LAPOINTE.
SPIRAL BROACHING APPLIANCE.
APPLICATION FILED MAY 16, 1912.

1,218,191.

Patented Mar. 6, 1917.

Witnesses:
C. L. Rogers
R. G. Hersey

Inventor:
Ralph R. Lapointe,
by Geo. W. Maxwell,
Attorney.

UNITED STATES PATENT OFFICE.

RALPH R. LAPOINTE, OF HUDSON, MASSACHUSETTS, ASSIGNOR TO LAPOINTE MACHINE TOOL COMPANY, OF HUDSON, MASSACHUSETTS, A CORPORATION OF MAINE.

SPIRAL BROACHING APPLIANCE.

1,218,191.  Specification of Letters Patent.  Patented Mar. 6, 1917.

Application filed May 16, 1912. Serial No. 697,739.

*To all whom it may concern:*

Be it known that I, RALPH R. LAPOINTE, a citizen of the United States, and resident of Hudson, county of Middlesex, State of Massachusetts, have invented an Improvement in Spiral Broaching Appliances, of which the following description, in connection with the accompanying drawings, is a specification, like letters on the drawings representing like parts.

The present invention relates to apparatus for producing spiral broach cuts, and, more particularly, to an appliance adapted to coöperate with a spiral broach to guide and control the movement thereof in relation to a work-piece so that it is effective for producing the desired spiral path in the work. More particularly the invention has to do with improved means for causing the timed rotation of the broach relative to its reciprocation and by the same driving impulse as effects its reciprocation.

The invention will be better understood from the following detailed description, taken in connection with the accompanying drawings, and will be thereafter pointed out in the appended claims.

Referring to the drawings.

Figure 3:
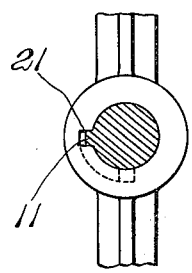
Fig. 3 is a view in section on line 3—3 of Fig. 1.

The broach indicated at 10 has a spiral rib 11 interrupted to form cutting teeth, extending through its operative portion. This broach is connected in a suitable manner, shown as by a key 12 to a swivel head 13 fitted to a bearing box 14 at the end of an operating screw 15, the engaging portions of the swivel head and its bearing box being shown as provided with an anti-friction ball bearing 16. The face plate or head of a broaching machine is shown conventionally at 17, the broach passing centrally through this plate or head, as is usual. In the illustrative form of the invention shown a yoke member 18 is provided, having flanges 19 at its sides for securing the same to the head 17. This yoke member has a nut portion 20 formed with a spiral channel or thread 21 suitably fashioned to conform to the pitch of the spiral rib 11, which fits therein, the channel 21 being of a proper depth, as seen in Fig. 3, to receive the highest or outer end portion of the spiral cutting rib. A hollow work-piece *a* is shown as fitted on the broach 10 and held from turning by the clamping dog 22, which has an arm 23 extending to engage the yoke 18, being shown at 24 as forked to embrace and fit a side of said yoke. This clamping dog is clamped to the work-piece in any suitable manner, shown as by a set screw 25.

Figure 1:
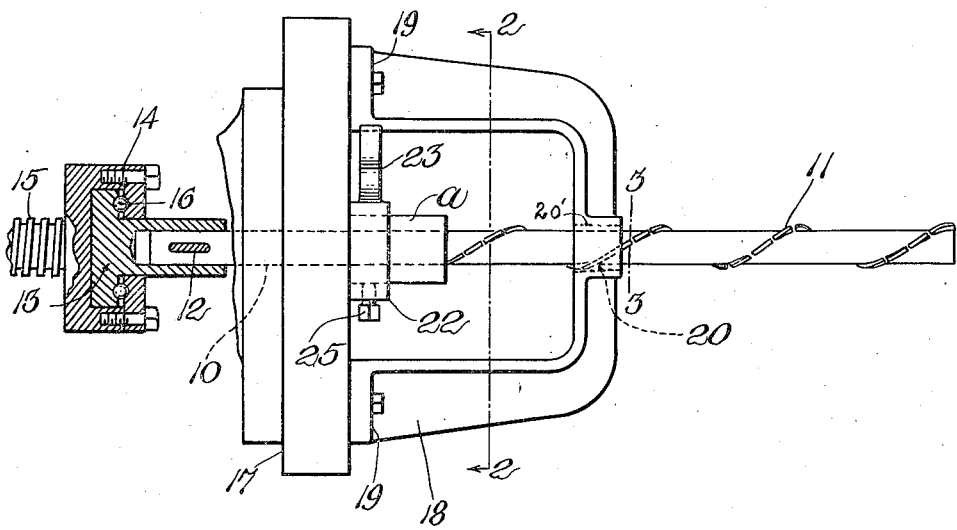
Figure 1 is a side elevation of my improved appliance, fashioned in the manner adapting it to be applied to a standard form of broaching machine, the swivel connection of the broach to its operating screw being shown in section.
Figure 2:
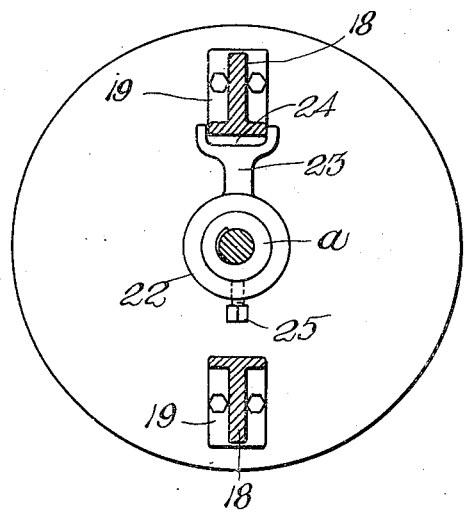
Fig. 2 is a view in section on line 2—2 of Fig. 1, looking in the direction of the arrows.

It may now be understood that as the work-piece *a* is guided on the broach and finds a backing against the machine head 17, it will be acted on by the spiral cutting rib 11 of the broach, which will produce a spiral cut opening into its central passage, corresponding in size and pitch to the rib 11. As the broach is drawn on its cutting stroke through the work by the screw 15, or to the left in Fig. 1, it is given a definite and precise turning movement relative to its lengthwise movement by the engagement of the rib 11 in the spiral channel 21 of the nut portion 20 carried by the yoke 18, and the extent of turning movement relative to the longitudinal movement of the broach will correspond exactly to the spiral pitch of the rib 11, so that this rib will make a cut of its own spiral character through the work-piece, *i. e.*, the cutting rib 11 will form a channel practically the same as that of the channel 21 in the controlling nut portion 20. The swivel connection afforded by the swivel head 13 and its box 14 with the anti-friction bearing between permits the broach to turn freely as required by the engagement of the rib 11 with the nut in which it fits, and thus the energy required for the cut is substantially only that involved in the engagement of the cutting rib with its "land" in the work-piece.

I am aware that my invention can be varied in numerous respects without departing from the spirit thereof; for example while the nut portion 20 is shown as an inserted collar 20', this is merely illustrative, as are also various of the other features of construction, and I therefore do not desire to be limited in these or in other respects, except as set forth in the appended claims, Having described my invention, what I claim as new and desire to secure by Letters Patent is:

1. Apparatus of the kind described, comprising a broach provided with spiral cutting means and an operating mechanism for reciprocating the same, a swivel connection from the inner end of the broach to said operating mechanism, a machine frame work having a head equipped with means for holding a work piece against rotation, and means for effecting turning of the broach as it moves longitudinally, said latter means being formed and mounted to engage said spiral cutting means at the outer end portion of the broach outside of and adjacent the work piece.

2. Apparatus of the kind described, comprising a broach having a spiral cutting rib and operating mechanism for reciprocating the same, a swivel connection from said broach to said operating mechanism, means for mounting a work piece and holding it against rotation, and a fixed guide having a spiral channel adapted to engage and direct said spiral rib to effect a controlled rotary movement of the broach as it moves lengthwise, said guide being mounted in position to engage the broach outside of and relatively close to the work piece.

3. Apparatus of the kind described, comprising a broaching machine head, a broach mounted for reciprocation through said head and having a spiral cutting rib, a yoke formed for removable attachment to said machine head and having a guide passage for the outer end of said broach provided with a channel for receiving and fitting said rib whereby said broach is caused to turn as it moves endwise, and a clamping dog having a portion arranged to engage said yoke for holding a work piece against rotation on said broach as it is operated on thereby.

In testimony whereof, I have signed my name to this specification, in the presence of two subscribing witnesses.

RALPH R. LAPOINTE.

Witnesses:
C. L. ROGERS,
R. G. HERSEY.